United States Patent [19]

Mayer et al.

[11] 4,313,817
[45] Feb. 2, 1982

[54] HYDROCARBON CONVERSION CATALYST AND PROCESS USING SAID CATALYST

[75] Inventors: Jerome F. Mayer, San Anselmo; Stephen J. Miller, San Francisco, both of Calif.

[73] Assignee: Chevron Research Company, San Francisco, Calif.

[21] Appl. No.: 160,033

[22] Filed: Jun. 16, 1980

Related U.S. Application Data

[63] Continuation-in-part of Ser. No. 21,751, Mar. 19, 1979.

[51] Int. Cl.$^3$ .................... C10G 45/08; C10G 47/20; C10G 65/12
[52] U.S. Cl. .................................. 208/89; 208/58; 208/59; 208/111; 208/254 H
[58] Field of Search .......................... 208/111, 58–59, 208/89, 254 H

[56] References Cited

U.S. PATENT DOCUMENTS

| | | | |
|---|---|---|---|
| 3,535,225 | 10/1970 | Jaffe | 208/59 |
| 3,535,226 | 10/1970 | Jaffe | 208/59 |
| 3,700,585 | 10/1972 | Chen et al. | 208/111 |
| 3,702,886 | 11/1972 | Argauer et al. | 423/328 |
| 3,770,614 | 11/1973 | Graven | 208/62 |
| 3,894,938 | 7/1975 | Gorring et al. | 208/97 |
| 4,137,148 | 1/1979 | Gillespie et al. | 208/87 |

Primary Examiner—Delbert E. Gantz
Assistant Examiner—G. E. Schmitkons
Attorney, Agent, or Firm—D. A. Newell; S. R. LaPaglia; A. H. Uzzell

[57] ABSTRACT

An improved hydrocarbon conversion catalyst consisting essentially of: (A) a crystalline ZSM-5 zeolitic molecular sieve component substantially free of any catalytic loading metal; and (B) a matrix consisting essentially of (a) a gel selected from silica-alumina, silica-alumina-titania and silica-alumina-zirconia polygels, and (b) a hydrogenating component; and a process using said catalyst.

22 Claims, 1 Drawing Figure

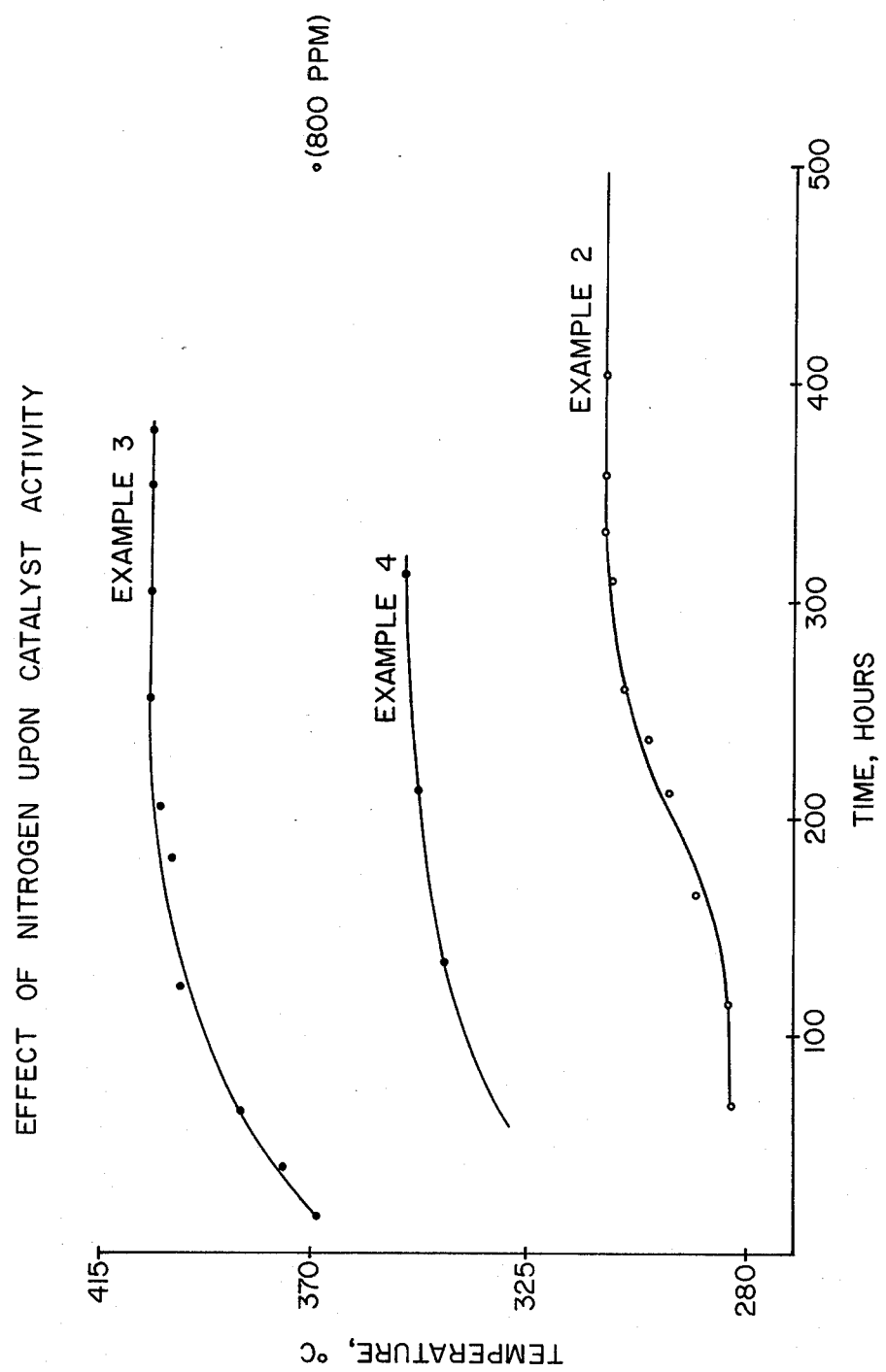

HYDROCARBON CONVERSION CATALYST AND PROCESS USING SAID CATALYST

CROSS-REFERENCE TO RELATED APPLICATION

This application is a continuation-in-part of U.S. patent application Ser. No. 21,751 filed Mar. 19, 1979.

BACKGROUND OF THE INVENTION

This invention relates to an improved catalyst and to hydrocarbon conversion processes using said catalyst in connection with petroleum distillates and solvent-deasphalted residua feeds to produce high-value lube oil stocks and fuel products including gasoline.

PRIOR ART

It is known that a catalyst may comprise a crystalline aluminosilica zeolite component associated with other catalyst components. It is also known that at least some of said other catalyst components may be in the form of a matrix in which the zeolite component is dispersed. It is also known that such catalysts may be used for such reactions as catalytic cracking, hydrocracking, and hydrodesulfurization. Representative prior art patents disclosing one or more of the foregoing matters include: U.S. Pat. Nos. 3,140,251, 3,141,253, 3,758,402, and 3,535,225.

There is a continuing search for further improvements in such catalysts, and in similar multi-component catalysts, particularly for hydrocracking usage. In view of the foregoing, an object of the present invention is to provide an improved hydrocracking catalyst having, compared with similar prior art catalysts, improved hydrocracking activity.

It is a further object of the present invention to provide a hydrocracking process using said improved catalyst that is capable of producing low pour-point lubricating oils and other valuable petroleum products including fuels and the like.

The present invention will best be understood, and further objects and advantages thereof will be apparent, from the following description.

SUMMARY OF THE INVENTION

In one aspect of the invention herein an improved composition is provided consisting essentially of a catalyst composite containing:

(A) a porous amorphous matrix selected from the group consisting of alumina-silica, alumina-silica-titania and alumina-silica-zirconia polygels, said gel having an alumina-to-silica weight ratio in the range of from about 0.2-20 to 1, respectively;

(B) a hydrogenation component of (1) nickel or cobalt or any combination thereof in an amount, calculated as metal, in the range of from about 1 to 10 weight percent of said matrix, and (2) molybdenum or tungsten, or any combination thereof, in an amount, calculated as metal in the range of from about 5 to 25 weight percent of said matrix, said component being (1) in the form of metal or oxide or sulfide or any combination thereof and (2) dispersed through said matrix; and (C) a finely divided crystalline aluminosilicate zeolite component substantially in the ammonium or hydrogen form, said zeolite being (1) substantially free of such hydrogenating component and (2) dispersed through said matrix;

the improvement comprising the composition wherein said zeolite component is of the ZSM-5 type.

In a preferred aspect of the invention, the matrix of the composition described above contains (1) at least 15 weight percent of silica and (2) an amount of titania, calculated as metal, in the range of from about 1 to 10 weight percent, the compounds containing an amount of the zeolite in the range of from about 1 to 50 weight percent and a surface area above about 200 m$^2$/g.

Other preferred aspects of the invention include the above-described composition wherein the amount of zeolite is about 17%, the hydrogenating component is nickel and tungsten in amounts of about 7 and 17 weight percent respectively and the matrix contains about 7 weight percent of titania.

In a yet further aspect of the invention herein, the above-described catalyst is contacted with a hydrocarbon feed containing substantial amounts of materials boiling above 95° C. and selected from the group consisting of petroleum distillates, solvent-deasphalted residua, and shale oils, in a reaction zone with hydrogen and the catalyst under hydrocarbon hydrocracking conditions, and preferred variations thereof wherein the catalyst is more particularly described, for example in terms of silica, titania, and zeolite contents.

Other preferred aspects of the invention will be clear from the description to follow and of the appended claims.

EMBODIMENT

In a preferred embodiment, a typical vacuum gas oil feed is hydrocracked under low-pressure hydrocracking conditions which are maintained at a severity sufficient to provide about a 16% conversion of the feed to product which boils below 315° C. The feed is a paraffinic hydrofined distillate which is the 371° C.+ portion of an Arabian light vacuum gas oil hydrocracked to a liquid product of which 50 volume percent boils below 371° C. The 371° C.+ portion has a nitrogen-containing impurity content of about 7 ppmw and the following inspections:

| | |
|---|---|
| Gravity, °API | 35.4 |
| Sulfur, ppm | 33 |
| Pour Point, °C. | 29 |
| Hydrocarbon Distribution, LV % | |
| Paraffins | 29 |
| Naphthenes | 44 |
| Aromatics | 25 |
| Sulfur Compounds | 2 |
| Distillation, %, °C. | |
| 5/30 | 391/413 |
| 50/70 | 433/455 |
| 90/EP | 485/521 |

The freshly prepared catalyst in which the zeolite is a ZSM-5 in the H-form and substantially free of hydrogenating components has the following composition:

| Component | Wt. % |
|---|---|
| Ni | 7 |
| W | 17 |
| SiO$_2$ | 22 |
| Al$_2$O$_3$ | 25 |
| TiO$_2$ | 7 |
| H-ZSM-5 | 17 |

In the process the initial or start-up temperature using a freshly prepared catalyst is about 284° C. and the process is carried out under the following additional conditions:

| Pressure, Atm. g. | 41 |
|---|---|
| LHSV, V/V/Hr | 2.2 |
| Hydrogen Rate, SCM/m$^3$ | 1780 |

The feed conversion level to product boiling below 315° C. is about 16%. In order to maintain the conversion level, the temperature is gradually increased over a period of about 320 hours until it reaches about 310° C., after which little or no further increase is required during the more useful portion of the catalyst life-cycle (e.g., the period between start-up and regeneration or successive regenerations).

A typical product stream for a low nitrogen feedstock has the following composition:

| Product, Wt. % | |
|---|---|
| $C_1$-$C_2$ | trace |
| $C_3$-$C_4$ | 6 |
| $C_5$-83° C. | 3 |
| 83°-315° C. | 7 |
| 315° C.+ | 84 |

The separated 315° C.+ fraction has a pour point of about 2° C.

THE CATALYST

The catalyst required herein may be prepared by any suitable method whereby the zeolite component is present in an amorphous siliceous cracking matrix and is substantially free of catalytic hydrogenating components. In a preferred method, the zeolite in the H-form is added to a slurry of a silica-alumina cogel containing the desired hydrogenating components in the form of precipitated oxides and/or hydroxides (see, for example, U.S. Pat. No. 3,535,225—J. Jaffe—which is incorporated herein by reference). Preferably the matrix is selected from the group consisting essentially of alumina-silica, alumina-silica-titania and alumina-silica-zirconia polygels having an alumina-to-silica weight ratio in the range of from about 0.2-20 to 1, respectively. Gels which contain titania, zirconia, and the like moderators desirably contain them in an amount, calculated as metal, in the range of from about 1 to 10 weight percent.

The ZSM-5-type crystalline aluminosilicates required herein are known in the art and of themselves are not considered to be inventive. This type of zeolite is exemplified by ZSM-5 (which is preferred), ZSM-11 and ZSM-35 and other similar zeolites. U.S. Pat. Nos. 3,700,585, N. Y. Chen et al; 3,702,886, R. G. Argauer et al; and 3,770,614, R. G. Graven, describe the ZSM-5 preparation, composition and related information, the entire contents of which are incorporated herein by reference. The H-form (H-ZSM), and the Zn-form (Zn-ZSM) and mixture thereof (Zn-H-ZSM), as well as rare earth-exchange modifications thereof, required herein are obtained by conventional base- and/or ion-exchange methods routinely employed in the zeolite art, including customary zeolite drying and calcining steps. Preferably, the ZSM-5-type zeolites herein have minimal sodium contents, for example by weight less than about 100 ppm, although the ZSM-5-type zeolites having a larger sodium content exhibit relatively useful catalytic activities for present purposes.

PROCESS CONDITIONS

The process conditions satisfactory for use herein include:

| | Broad Range | Preferred Range |
|---|---|---|
| Temperature, °C. | 260-540 | 290-425 |
| Pressure, Atm. g. | 7-200 | 14-100 |
| Hydrogenation Rate, SCM/m$^3$ | 85-340 | 85-170 |
| LHSV, V/V/Hr | 0.1-100 | 0.2-10 |
| Per-Pass Conversion, % | 5-75 | 8-25 |

HYDROCARBON FEEDSTOCKS

The feedstocks suitable for use herein can be selected, for example, from the group consisting of petroleum distillates, e.g., distillates having a normal boiling point of from about 315° C. to 590° C., solventdeasphalted petroleum residua, and shale oils. The feedstocks can contain substantial amounts of materials boiling above 95° C., preferably substantial amounts of materials boiling in the normal boiling point range 180° to 510° C., and more preferably in the range 205° to 595° C. Suitable feedstocks include those heavy distillates normally defined as heavy straight-run gas oils and heavy cracked cycle oils, as well as conventional FCC feed and portions thereof. Cracked stocks may be obtained from thermal or catalytic cracking of various stocks, including those obtained from petroleum, gilsonite, and shale. As discussed hereinafter, the feedstocks may have been subjected to a hydrofining and/or hydrogenation treatment, which may have been accompanied by some hydrocracking, before being supplied to the present process. The feedstock can have an initial boiling point of at least about 315° C.

NITROGEN CONTENT OF FEEDSTOCKS

While the process herein can be practiced with utility when the feed contains organic nitrogen (nitrogen-containing impurities), for example as much as several thousand parts per million by weight of organic nitrogen, it is preferred that the organic nitrogen content of the feed be less than 50, more preferably less than 10, ppmw. Especially good results, in terms of activity and length of catalyst cycle (period between successive regenerations or start-up and first regeneration), are experienced when the feed contains less than 10 ppmw of organic nitrogen. This is surprising in view of the art (see, for example, U.S. Pat. No. 3,894,938).

SULFUR CONTENT OF FEEDSTOCKS

The presence of organic sulfur (sulfur-containing impurities) in the feedstock does not appear to deleteriously affect the desired hydrocracking of the feed, for example in terms of activity and catalyst life. In fact, hydrodesulfurizing of the feed of organic sulfur is in large part a significant concurrent reaction. However, the resulting product, in general, will contain at least some thiols and/or thioethers as a result of interreaction of hydrogen sulfide and olefinic hydrocarbons in the effluent product stream. Thus, it may be desirable in some instances that the feed prior to use in the process herein be hydrofined or hydrotreated for at least a substantial removal of both organic sulfur- and nitrogen-containing compounds.

Upstream hydrodenitrogenation can be performed in a separate reactor or in the reactor with the ZSM-5 containing catalyst. When a separate hydrodenitrogenation reactor is used, it may be desirable to remove, e.g. flash, light gaseous products such as $NH_3$ upstream of the ZSM-5 containing reactor. If the hydrotreating is performed in the same reactor, the ZSM-5 containing catalyst is disposed in one or more layers downstream of an active hydrodenitrogenation catalyst. The single reactor should preferably be operated under hydrotreating conditions sufficient to reduce the organic nitrogen of the feed to 10 ppmw or less before the feed encounters the ZSM-5 containing layer. The volume of hydrodenitrogenation catalyst relative to ZSM-5 containing catalyst can vary over a wide range, such as from about 1 to 1 to 100 to 1, preferably at least 2 to 1 and more preferably at least 5 to 1. The ratio depends upon such parameters as (a) the organic nitrogen content of the feedstock;
(b) the hydrodenitrification and hydrocracking activities of the upstream hydrotreating catalyst;
(c) the degree of overall hydrocracking desired.

An additional advantage of employing an upstream active hydrodenitrogenation catalyst is that much of the hydrocracking can be carried out over the hydrodenitrogenation catalyst, which would normally have a hydrocracking activity lower than the catalyst containing the ZSM-5-type zeolite. In this manner the presence of the ZSM-5-containing catalyst increases the overall hydrocracking activity of the combined catalyst charge, while the light gas make that accompanies hydrocracking over the ZSM-5 can be partially avoided.

The upstream hydrotreating catalysts can be any of the conventional catalysts having hydrodenitrogenation and hydrocracking activity. See, for example, U.S. Pat. No. 3,401,125 incorporated herein by reference. In general such hydrotreating catalysts are porous composites of inorganic matrix oxides such as alumina, silica, magnesia, etc. which contain one or more hydrogenation components such as transition elements, particularly elements of Group VIB or Group VIII of the Periodic Table of the Elements. *Handbook of Chemistry and Physics*, 45th Ed., Chemical Rubber Company. The Group VIB and/or Group VIII or other transition elements can be present as metals, oxides, or sulfides. The hydrotreating catalyst can also contain promoters such as phosphorus, titanium and other materials known in the art, present as metals, oxides or sulfides. The upstream hydrotreating catalyst need not contain a zeolite component. Typical upstream hydrogenation catalysts suitable for use herein contain 10 to 30 weight % amorphous silica, 20 to 40 weight % amorphous alumina, 15 to 30 weight % Group VIB metal oxide, preferably $WO_3$, 5 to 15 weight % Group VIII metal oxide, preferably NiO, and 2 to 15 weight % of a promotor oxide, preferably $TiO_2$. The hydrotreating catalyst should have an average pore size in the range of about 30 to 200 Angstroms and a surface area of at least about 150 square meters per gram.

EXAMPLES

The following examples illustrate the best mode presently contemplated for carrying out the invention.

EXAMPLE 1

A catalyst suitable for use herein was prepared using quantities of the various starting materials sufficient to produce a composite of the following composition:

| Component | Wt. % of Total Composite |
|---|---|
| NiO | 8.5 |
| $WO_3$ | 21.0 |
| $TiO_2$ | 6.7 |
| $Al_2O_3$ | 25 |
| $SiO_2$ | 22 |
| HZSM-5 | 16.8 |
| Total | 100.0 |

The following steps are employed in the preparation of the above catalyst:

(1) An aqueous acid solution is prepared by adding $AlCl_3$, $TiCl_4$ and $NiCl_2$ to an aqueous solution of acetic acid;

(2) Three aqueous alkaline solutions are prepared: (a) a sodium silicate solution; (b) a sodium tungstate solution; and (c) an ammonium solution containing sufficient ammonia such that, upon combining these alkaline solutions with the acidic solution, coprecipitation of all of the metal-containing components occurs at a neutral pH of about 7;

(3) The acid and alkaline solutions of (1) and (2) are combined and coprecipitation of all of the metal-containing components of these solutions occurs at a pH of about 7, resulting in a slurry of precipitated metal oxides and/or hydroxides in a silica-alumina cogel;

(4) H-ZSM-5-type crystalline aluminosilica zeolite in finely divided form is added to the slurry with thorough mixing;

(5) The slurry from (4) is filtered to produce a hydrogel cake which is then washed repeatedly with portions of dilute aqueous ammonium acetate solution to remove ionic sodium and chloride impurities from both the hydrogel and the zeolite;

(6) The washed cake is then shaped, for example by extrusion through a die about 0.3 cm in diameter and cut in similarly sized lengths, dried and calcined at about 510° C. in a flowing air stream in an oven for about 5 hours.

The finished catalyst is characterized by (1) a porous silica-alumina-titania polygel matrix in which the silica component is highly dispersed, (2) a hydrogenation component which is dispersed in the matrix, and (3) a zeolite component which is substantially free of catalytic hydrogenation metals and which is also dispersed in the matrix, there being little or none of the hydrogenation metals therein in intimate combination with the ZSM-5 zeolite. Other physical characteristics of the catalyst include a surface area of about 360 $m^2/g$, and a pore volume of about 0.36 cc/g. The catalyst is designated catalyst A.

EXAMPLES 2 AND 3

Under the conditions and using separate portions of the catalyst described in the embodiment above, the feed described therein (Example 2) and a feed having the following characteristics (Example 3):

| | |
|---|---|
| Gravity, °API | 22.9 |
| Sulfur, ppmw | 2100 |
| Nitrogen, ppmw | 870 |
| Pour Point, °C. | 29 |
| Hydrocarbon Distribution, LV % | |
| Paraffins | 19 |
| Naphthenes | 25 |
| Aromatics | 17 |

| -continued | |
|---|---|
| Sulfur Compounds | 22 |
| Distillation, %, °C. | |
| 5/30 | 374/413 |
| 50/70 | 445/467 |
| 90/EP | 504/537 | were hydrocracked. The results for these comparative examples are shown in the FIGURE. The data therein demonstrate the drastic effect of nitrogen-containing impurities in reducing catalyst activity of ZSM-5-containing hydrocracking catalysts. In Example 2, after about 500 hours on stream, sufficient alkylamine was added to the feed to provide a nitrogen content of about 800 ppmw. As shown in the FIGURE, there resulted an immediate reduction in the activity of the catalyst. These examples demonstrate that ZSM-5-containing hydrocracking catalysts are extremely sensitive to nitrogen-containing impurities. That nitrogen-containing impurity in the feed markedly reduces the pour point reduction is evident from the following:

| | Pour Point, °C. |
|---|---|
| Feed for Example 2 | 29 |
| Product from Example 2 | 2 |
| Feed for Example 3 | 29 |
| Product from Example 3 | 21 |

EXAMPLE 4

In this example the catalyst was, for practical purposes, identical to that of Examples 2 and 3 except that the molecular sieve component thereof was an ultrastable HY sieve (faujasite). The conditions and feed employed were the same as in Example 2. From a comparison of the data for Examples 2 and 3 as shown in the FIGURE, the performance of the catalyst of the present invention, in terms of the time-temperature relationship, was markedly superior. The pour points of the products were as follows:

| Example 2 | 2° C. |
|---|---|
| Example 4 | 29° C. |

In terms of pour point of the product, the advantage of the catalyst of the present invention over HY-sieve-containing catalyst is also remarkable.

EXAMPLES 5 AND 6

In a further comparison the catalysts used in Examples 2 and 4 were used in a high per pass conversion of a denitrified Empire vacuum gas oil feed having by volume the following percentage composition:

| Paraffins | 24 |
|---|---|
| Naphthenes | 49 |
| Aromatics | 27 |

The conditions employed were as follows:

| | Example 5 (HY-Sieve) | Example 6 (ZSM) |
|---|---|---|
| Per Pass Conversion | 80 | 80 |
| LHSV, V/V/Hr. | 1.4 | 1.4 |
| Average Cat. Temp., °C. | 334 | 311 |

| -continued | | |
|---|---|---|
| | Example 5 (HY-Sieve) | Example 6 (ZSM) |
| Total Pressure, Psig | 1328 | 1324 |
| $H_2$, Mean Pressure, Psia | 1168 | 1113 |
| Total Gas In, SCF/B | 6533 | 6834 |
| Recycle Gas, SCF/B | 5573 | 5541 | and the normalized (no loss) weight percent product yields were as follows:

| | Example 5 | Example 6 |
|---|---|---|
| $C_1$ | 0.01 | 0.01 |
| $C_2$ | 0.2 | 0.3 |
| $C_3$ | 3.4 | 13.5 |
| $i$-$C_4$ | 9.7 | 16.6 |
| $n$-$C_4$ | 3.9 | 9.3 |
| $C_5$–180° F. | 23.2 | 34.6 |
| 180°–380° F. | 61.7 | 28.3 |
| Total $C_5+$ | 84.9 | 63.0 |

While the $C_5+$ yield obtained in Example 5 was superior to that obtained in Example 6, the former, as shown by chromatographic analysis, had a large content of normal and slightly branched paraffins whereas the product obtained in the latter contained little or none of these paraffins. Thus, the ZSM-containing catalyst effectively removed low-octane-contributing paraffins from the product.

EXAMPLES 7 AND 8

Two hydrocracking runs were carried out with raw petroleum vacuum gas oil feed. In Example 7, the feed was passed downwardly through a fixed bed reactor containing a charge of an active hydrodenitrogenation catalyst designated as catalyst B. In Example 8, the feedstock was passed downwardly under identical conditions through a fixed bed reactor containing 10 parts by weight catalyst B over one part of a catalyst substantially identical to catalyst A. Catalyst B was a cogelled amorphous $SiO_2/Al_2O_3$ catalyst containing about 8.6% NiO, 21.5% $WO_3$ and 4.6% $TiO_2$, having a $SiO_2/Al_2O_3$ ratio of about 1, with an average pore volume of about 0.4 cc/gram and an average pore diameter of about 50 Angstroms. Such catalyst can be prepared for example by the method of U.S. Pat. No. 3,401,125.

The hydroprocessing conditions of Examples 7 and 8 included a space velocity (LHSV) of 1.2, a total pressure of 115 atmospheres, and a hydrogen feed rate of 3560 cubic meters per cubic meter of hydrocarbon feed. The temperature was varied to provide a constant product quality of 70 weight percent material boiling below 338° C. The hydrogenation conditions were selected to provide a feed of 1 ppmw nitrogen content to the ZSM-5-containing catalyst region of the reactor of Example 8. The results of these tests are depicted in the following table:

| | Example 7 | Example 8 |
|---|---|---|
| Temperature after 280 hours, °C. | 423 | 410 |
| Pour point of 200–340° C. product, °C. | −32 | −37 |
| Pour point of 340° C.+ product, °C. | 20 | 20 |
| Yield, wt. % | | |
| $C_1$–$C_4$ | 4.4 | 5.4 |
| $C_5$–80° C. | 9.4 | 10.7 |
| 80–200° C. | 19.7 | 23.1 |
| 200–340° C. | 37.7 | 31.6 |

|  | Example 7 | Example 8 |
|---|---|---|
| 340° C.+ | 28.8 | 29.2 |

What is claimed is:

1. A hydrocracking process comprising contacting a hydrocarbon feed containing substantial amounts of materials boiling above 95° C. in a reaction zone with hydrogen and a catalyst under hydrocracking conditions, wherein said catalyst comprises a composite containing:
(A) a porous amorphous matrix selected from the group consisting of alumina-silica, alumina-silica-titania and alumina-silica-zirconia polygels, said polygel having an alumina-to-silica weight ratio in the range of from about 0.2–20 to 1, respectively;
(B) a hydrogenation component of (1) nickel or cobalt or any combination thereof in an amount, calculated as metal, in the range of from about 1 to 10 weight percent of said matrix, and (2) molybdenum or tungsten, or any combination thereof, in an amount, calculated as metal in the range of from about 5 to 25 weight percent of said matrix, said hydrogenation component being (1) in the form of metal or oxide or sulfide or any combination thereof and (2) dispersed through said matrix; and
(C) a finely divided crystalline aluminosilicate zeolite component of the ZSM-5 type substantially in the ammonium or hydrogen form, said zeolite being (1) substantially free of such hydrogenation component and (2) dispersed through said matrix.

2. The process as in claim 1 wherein said matrix of said catalyst contains (1) at least 15 weight percent of silica, and (2) an amount of titania, calculated as metal, in the range of from about 1 to 10 weight percent and said composite contains an amount of said zeolite in the range of from about 1 to 50 weight percent and has a surface area above about 200 m$^2$/gram.

3. The process as in claim 2 wherein said amount of zeolite is about 17%, said hydrogenating component is nickel and tungsten in amounts of about 7 and 17 weight percent, respectively, and wherein said matrix contains about 7 weight percent of titania.

4. A process as in claim 1 wherein said feed has a content of nitrogen-containing impurities, calculated as nitrogen, which is below about 10 ppmw.

5. A process as in claim 4 wherein said feed is a petroleum distillate and at least a fraction of the resulting product is a lube oil having, relative to said feed, an improved pour point.

6. A process as in claim 1 wherein said hydrocracking conditions are controlled so as to maintain a feed conversion level in the range of from about 5 to 75 volume percent.

7. A process as in claim 1 wherein said feed has an initial normal boiling point of at least about 315° C.

8. A process as in claim 5 wherein said distillate has a normal boiling point in the range of from about 315° C. to 590° C.

9. A process as in claim 1 wherein said hydrocarbon feed is selected from the group consisting of petroleum distillates, solvent deasphalted residua, and shale oils.

10. A process as in claim 4 wherein said catalyst is disposed downstream of a reaction zone in which a hydrocarbon feed is contacted under hydroprocessing conditions with an active hydrodenitrogenation catalyst.

11. A process as in claim 10 wherein said hydrodenitrogenation catalyst is disposed in a single reactor with said composite containing a ZSM-5-type zeolite component.

12. A process as in claim 11 wherein said reactor contains at least 2 parts by volume hydrodenitrogenation catalyst upstream of one part by volume of said composite containing a ZSM-5-type zeolite component.

13. A process as in claim 10, 11 or 12 in which said hydrodenitrification catalyst is a porous composite containing an inorganic matrix oxide selected from the group consisting of alumina, silica, magnesia, and mixtures thereof, and at least one hydrogenation component selected from Group VIB and Group VIII elements, present as metals, oxides or sulfides.

14. A hydrocracking process comprising contacting a hydrocarbon feed containing substantial amounts of materials boiling above 95° C., said feed having a content of nitrogen-containing impurities, calculated as nitrogen, which is below about 10 ppmw, in a reaction zone with hydrogen and a catalyst under hydrocracking conditions wherein said catalyst comprises a composite containing:
(A) A porous amorphous matrix selected from the group consisting of alumina-silica, alumina-silica-titania and alumina-silica-zirconia polygels, said polygels having an alumina-silica weight ratio in the range of from about 0.2–20 to 1 respectively;
(B) A hydrogenation component of (1) nickel in an amount, calculated as metal, in the range of from about 1 to 10 weight percent of said matrix, and (2) tungsten, in an amount calculated as metal, in the range of from about 5 to 25 weight percent of said matrix, said hydrogenation component being in the form of metal or oxide or sulfide or any combination thereof and (3) dispersed through said matrix; and
(C) A finely divided crystalline aluminosilicate zeolite component of the ZSM-5-type substantially in the ammonium or hydrogen form, said zeolite being (1) substantially free of hydrogenation component and (2) dispersed through said matrix.

15. The process as in claim 14 wherein said matrix of said catalyst contains (1) at least 15 weight percent of silica, and (2) an amount of titania, calculated as metal, in the range of from about 1 to 10 weight percent and said composite contains an amount of said zeolite in the range of from about 1 to 50 weight percent and has a surface area above about 200 m$^2$/gram.

16. The process as in claim 15 wherein said amount of zeolite is about 17%, said hydrogenating component is nickel and tungsten in amounts of about 7 and 17 weight percent, respectively, and wherein said matrix contains about 7 weight percent of titania.

17. A process as in claim 14 wherein said feed is a petroleum distillate and at least a fraction of the resulting product is a lube oil having, relative to said feed, an improved pour point.

18. A process as in claim 14 wherein said hydrocracking conditions are controlled so as to maintain a feed conversion level in the range of from about 5 to 75 volume percent.

19. A process as in claim 14 wherein said feed has an initial normal boiling point of at least about 315° C.

20. A process as in claim 17 wherein said distillate has a normal boiling point in the range of from about 315° C. to 590° C.

21. A process as in claim 14 wherein said catalyst is disposed downstream of a reaction zone in which a hydrocarbon feed is contacted under hydroprocessing conditions with an active hydrodenitrogenation catalyst.

22. A process as in claim 21 in which said hydrodenitrification catalyst is a porous composite containing an inorganic matrix oxide selected from the group consisting of alumina, silica, magnesia, and mixtures thereof, and at least one hydrogenation component selected from Group VIB and Group VIII elements, present as metals, oxides or sulfides.

* * * * *